Dec. 4, 1951   H. O. WENDT   2,577,439
DIFFERENTIAL SPRING BALANCE TAB
Filed Oct. 18, 1947   2 SHEETS—SHEET 1
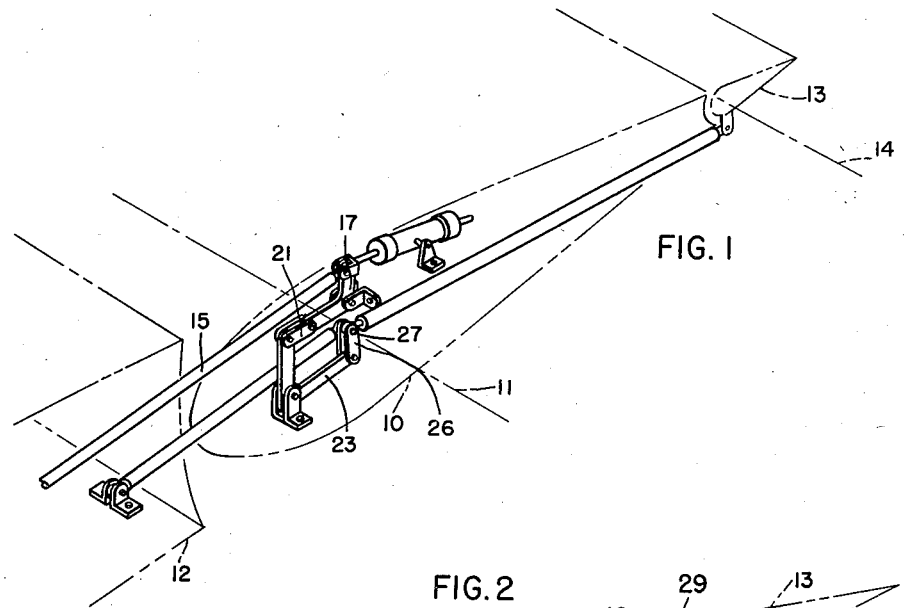
FIG. 1
FIG. 2
FIG. 3
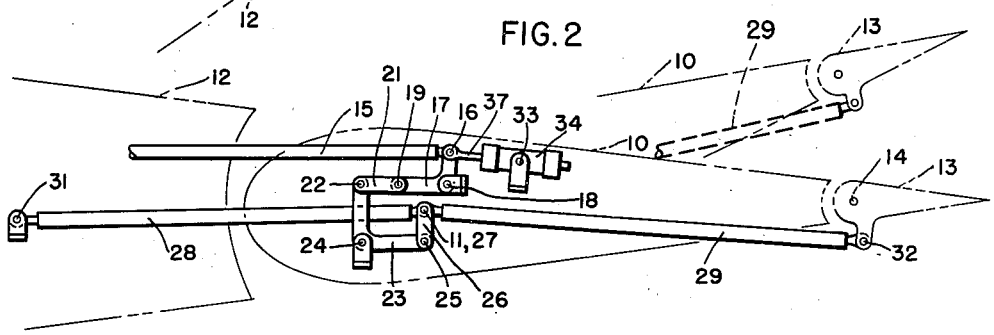
FIG. 4
INVENTOR.
BY HAROLD O. WENDT
Richard W. Treverton
ATTORNEY Dec. 4, 1951      H. O. WENDT      2,577,439

DIFFERENTIAL SPRING BALANCE TAB

Filed Oct. 18, 1947      2 SHEETS—SHEET 2

*INVENTOR.*
BY HAROLD O. WENDT

Richard W. Treverton
*ATTORNEY*

Patented Dec. 4, 1951

2,577,439

UNITED STATES PATENT OFFICE 2,577,439

DIFFERENTIAL SPRING BALANCE TAB

Harold O. Wendt, Columbus, Ohio, assignor to Curtiss-Wright Corporation, a corporation of Delaware Application October 18, 1947, Serial No. 780,701

9 Claims. (Cl. 244—82)

This invention relates to airplane control means of the type wherein a tab is hinged to the trailing edge of a control airfoil for providing aerodynamic balance.

Usually tabs of this kind are geared to the airplane structure in such manner that deflection of the tab relative to the control airfoil is approximately proportional to the control airfoil's deflection. In some instances means have been provided whereby this proportion, or balance ratio, may be adjusted to different values by the pilot so that more or less aerodynamic balance may be provided. As applied to large airplanes the geared tab arrangements of this general kind, if designed or adjusted so that the pilot control forces do not become excessive at very high angles of deflection of the control airfoil, have the disadvantage that the control force required to produce a given angular acceleration of the airplane, or "g" load, is so low that the pilot may not obtain the minimum degree of control feel that is regarded as necessary for safe airplane operation. Conversely, if with the geared balance tab there is sufficient control force per "g" then the control force will be excessive at high angles of control airfoil deflection which are often necessary at relatively low airspeeds.

The present invention provides a differential spring balance arrangement whereby the tab deflection is proportionate both to control airfoil deflection and to control force. As with conventional geared balance tabs the tab effect is small at small angles of control airfoil deflection, but by the response of the present arrangement to control forces the effect of the tab at high angles of control airfoil deflection may be either large or small depending upon whether the control force is high or low. Accordingly with this arrangement the control forces at high angles of deflection of the control surface may be kept within the desired limits while at the same time the control force per "g" may be sufficient to afford the pilot the necessary degree of control feel.

The present invention differs substantially from the conventional spring tab arrangement in which the tab has an unyielding connection with the pilot operated control system and the control airfoil is connected thereto by a spring unit. With such an arrangement the tab deflection varies with pilot control force and has no direct relation to the degree of deflection of the control airfoil. Such an arrangement is effective from the standpoint of reducing pilot control forces, but it possesses the undesirable characteristic that at higher airspeeds the control force per "g" decreases to such an extent that the pilot may no longer obtain the desired degree of control feel.

Objects and advantages of the present invention additional to those referred to hereinbefore will appear from the following description, made with reference to the accompanying drawings, wherein:

Figure 1 is a perspective view of the differential balance tab linkage as applied to a tab associated with an airplane stabilizer and elevator, the tab and the stabilizer-elevator assembly being shown in phantom;

Figure 2 is a side elevation of the elements shown in Figure 1, the full line position representing the condition of the parts with the elevator in neutral position and with no control force applied, and the dotted line position representing an up-elevator no-control-force condition;

Figure 3 is a view similar to Figure 2 but illustrating in full lines a down-elevator high-control-force condition and in dotted lines an up-elevator high-control-force condition;

Figure 4 is a longitudinal sectional view through the spring unit shown in the preceding views;

Figure 7:
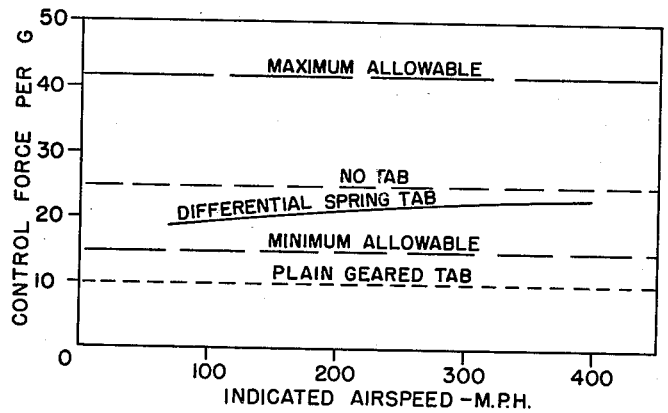
Figure 7 is a graph showing a similar comparison for the control force per "g" versus airspeed relationship.

As shown in Figures 1 and 2, the control airfoil or elevator 10 is hinged upon an axis designated 11 to a part of the airplane structure, in this case to the trailing edge of a horizontal stabilizer 12, and the aerodynamic balance tab 13 is pivoted about an axis 14 to the trailing edge of the elevator. For controlling the elevator a suitable linkage including push-pull rod 15 is extended from the pilot operable control stick or control wheel column. Rod 15 is pivoted at 16 to one arm of a first bellcrank lever 17 which is pivoted at 18 to a bracket affixed to the elevator and whose other arm is pivoted at 19 to a connecting link 21. The latter is pivoted at 22 to one arm of a second bellcrank 23.

The bellcrank 23 is pivoted at 24 to a bracket that is rigid with the elevator, and its other arm is pivoted at 25 to another connecting link 26. This connecting link is pivoted at 27 to each of links 28 and 29. Link 28 extends into the stabilizer where it is pivoted at 31 to the airplane structure, and its function is to support pivot 27 for movement relative to the airplane structure 12. Link 29 is the control link for tab 13 and it is pivoted at 32 to a control horn on the tab.

Pivoted at 33 to the elevator is a spring cartridge unit 34 comprising a tubular casing 35 with adjustable screw-threaded end closure caps 36. Though the latter extends slidably a rod 37 which is pivoted at 16 to rod 15 and to bellcrank 17. Springs 38 within the cartridge casing act upon a cross-head 39 that is secured to the rod 37 and is slidable within the casing. It will be seen that the spring cartridge unit serves to elastically restrain movement of the bellcrank 17 relative to the elevator, and together with the bellcrank serves as a connection, effective between the control means 15 and the elevator, that is capable of yielding under control forces.

It will be observed that, in the neutral condition of the elastic means depicted in Figures 1 and 2, the pivot connection 27 of links 26, 28 and 29 is substantially coincident with the pivot axis 11 of the elevator. As long as no control pressure is applied, the tab 13 will remain in its neutral position with relation to the elevator, even though the latter is deflected. An example of this deflected condition is the up-elevator position shown in dotted lines in Figure 2.

Upon the application of a control force which deflects the elastic means in either direction the bellcrank 23 will be swung clockwise (as viewed in Figures 1 to 3) relative to the elevator, displacing the pivot 27 from the elevator hinge axis 11. If the elevator is in its neutral position wherein the links 28 and 29 are in nearly straight line relation as will appear from Figure 2, such displacement of pivot 27 will not appreciably move the tab 13 relative to the elevator. But with deflection of the elevator in either direction from its neutral position, the displacement of pivot 27 from hinge axis 11 will cause an opposite deflection of the tab relative to the elevator, to provide an aerodynamic balancing effect. It will thus be seen that the degree of tab deflection will depend upon the degree of elevator deflection and also upon the amount of control force applied through the pilot's control system.

Figure 5:
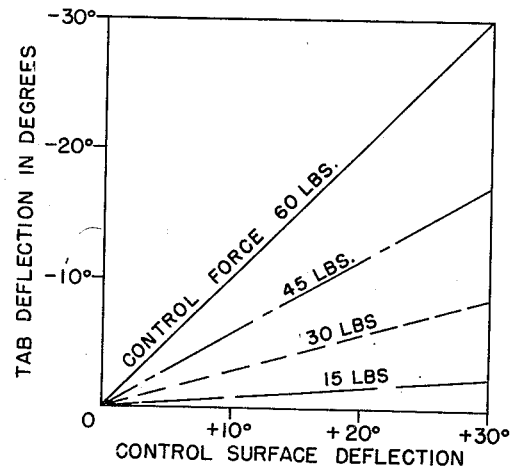
Figure 5 is a graph showing the tab deflection versus control surface deflection for various control forces with the tab arrangement of the present invention applied to an airplane chosen as an example.

With the tab operating linkage arrangement shown in the drawings applied to an airplane chosen as an example the degree of tab deflection per degree of control surface deflection is shown in Figure 5 for various control forces applied to the control wheel of the airplane. It will be seen from this example that the ratio of tab deflection to control airfoil deflection increases rapidly with increase of control pressure. As is shown, at a 20° control airfoil up-deflection, with a 60 pound control force, the tab down-deflection will be approximately 20° or approximately twelve times as great for a 15 pound control force with which the tab down deflection will be only about 2°.

Figure 6:
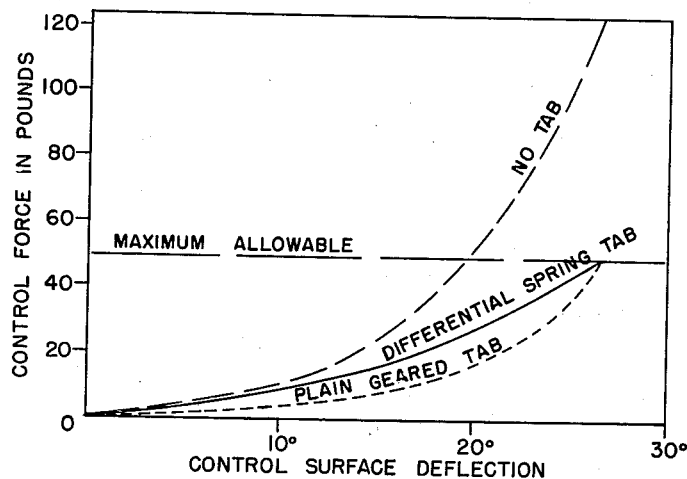
Figure 6 is a graph showing the control force versus control surface relationship with the present tab arrangement for the example airplane in comparison with the corresponding relationships for the same airplane without any tab and also with a conventional geared tab.

The advantageous effects of the present tab arrangement as compared with other arrangements is shown graphically in Figures 6 and 7. The solid line curve in Figure 6 shows the relationship of control force to control surface deflection when the control surface chosen as an example is provided with the tab arrangement of the present invention and the airspeed is such that at a maximum control surface deflection of 27° the control force is fifty pounds, this control force being assumed to be the permissible maximum. The short dotted line curve of Figure 6 shows the control forces under the same conditions when the same airfoil is provided with a conventional geared tab that is geared so that the same maximum allowable control force of fifty pounds is required at maximum control surface deflection. The long dotted line curve of Figure 6 shows the relationship under the same conditions for the same airfoil without any tab. It will be noted that when no tab is employed the required control force exceeds the permissible maximum long before the maximum airfoil deflection is obtained.

In Figure 7 is shown the control forces, required to produce an acceleration force on the airplane of one gravity, with each of the three tab arrangements indicated in Figure 6. It will be seen that this control force per "g" is well above fifteen pounds, chosen as the permissible minimum, for the control airfoil when provided with no tab and also when provided with the tab system of the present invention. However with the conventional geared tab the control force per "g" is well below the required minimum.

It will be understood that the values of control forces, deflection angles, and airspeeds shown on the graphs, Figures 5 to 7, are merely examples computed to illustrate the principles involved, and that these values will differ for each different airplane design. However, the graphs illustrate that the present tab arrangement provides a means whereby the control forces may be kept within established limits which would be impossible without any balance tab or with the conventional geared balance tab.

Another advantage, inherent in the present tab operating link arrangement, resides in its anti-flutter characteristics. As will be seen from Figure 2, the links 28 and 29 assume a nearly straight line relation to each other when the elevator is in neutral or nearly neutral position, which will almost invariably be the case at very high airspeeds. As a result the aerodynamic loads on the tab will produce only very small vertical loads on pivot 27. Furthermore in the no-control-force condition of the linkage, wherein as shown in Figure 2 the pivot points 22, 19 and 18 are substantially in straight alignment, or dead center relationship, vertical loads on pivots 27 will not be transmitted to the control link 15. Accordingly the operation of the linkage is substantially irreversible when at and near neutral condition of the controls, and will therefore discourage flutter from developing in the system at high airspeeds.

It will be understood that while described with particular relation to an airplane elevator the invention is equally applicable to rudders, ailerons, elevators and other kinds of control surfaces. It will be understood further that the structure and arrangement of parts shown and described herein are merely by way of illustrating the inventive principles that are involved, and that these principles may be otherwise embodied without departing from the spirit of my invention or from the scope of the appended claims.

I claim:

1. In a control system for an airplane having fixed airfoil structure and a control airfoil hinged to the fixed structure, the combination therewith comprising a tab hinged to the trailing edge of the airfoil, a first link pivoted to the tab and a second link pivoted to said structure, said links being pivoted to each other and to a first connecting link upon a pivot axis that may be moved into substantial coincidence with the control airfoil hinge axis, first and second bellcranks pivoted to the airfoil, the first bellcrank having one arm thereof pivoted to a push-pull control element and the other arm thereof pivotally connected by a second connecting link to one arm of the second bellcrank, the other arm of the second bellcrank being pivoted to said first connecting link, and elastic means for yieldably supporting the first bellcrank in the neutral position thereof relative to the control airfoil in which said link pivot axis is substantially coincident with the control airfoil hinge axis, said second connecting link having the pivots thereof in substantially straight alignment with the pivot of the first bellcrank when in said neutral position to substantially prevent the transmission of forces from the tab to the control link.

2. In a control system for an airplane having a control airfoil hinged thereto, the combination therewith comprising a tab hinged to the trailing edge of the airfoil, a first link pivoted to the tab and a second link pivoted to the airplane, said links being pivoted to each other and to a first connecting link upon a pivot axis that may be moved into substantial coincidence with the control airfoil hinge axis, first and second members pivoted to the airfoil, the first member having one pivot connection to a push-pull control element and another pivot connection to a second connecting link, the second connecting link being pivoted to the second member, said first connecting link being pivoted to the second member, whereby upon pivotal movement of the first member by said push-pull control element the link pivot axis will be moved, and elastic means for yieldably supporting the first member in the neutral position thereof relative to the control airfoil in which said link pivot axis is substantially coincident with the control airfoil hinge axis.

3. In a control system for an airplane having a control airfoil hinged thereto, the combination therewith comprising a tab hinged to the trailing edge of the airfoil, a first link pivoted to the tab and a second link pivoted to said structure, said links being pivoted to each other upon a pivot axis that may be moved into substantial coincidence with the control airfoil hinge axis, a control element and a differential linkage connecting the element with the airfoil and with said links, said differential linkage upon movement of the control element in either direction effecting movement of the airfoil or displacement of said pivot axis in one direction from coincidence with the control airfoil hinge axis or both airfoil movement and pivot axis displacement, said differential linkage including elements that are in substantially dead center relationship when said axes are in substantial coincidence to substantially prevent the transmission of forces from the tab to the control link, and elastic means for resisting such displacement of said link pivot axis.

4. In a control system for an airplane having a control airfoil hinged thereto, the combination therewith comprising a tab hinged to the trailing edge of the airfoil, a first link pivoted to the tab and a second link pivoted to the airplane, said links being pivoted to each other and to a first connecting link upon a pivot axis that may be moved into substantial coincidence with the control airfoil hinge axis, a control element and a differential linkage connecting the element with the airfoil and said links, said differential linkage upon movement of the control element effecting movement of the airfoil or displacement of said link pivot axis from coincidence with the control airfoil hinge axis or both such airfoil movement and pivot axis displacement, said differential linkage including elastic means for resisting such displacement of said link pivot axis, and said differential linkage also including elements that are in substantially dead center relationship when said axes are in substantial coincidence to substantially prevent the transmission of forces from the tab to the control link.

5. In a control system for an airplane having a control airfoil hinged thereto, the combination therewith comprising a tab hinged to the trailing edge of the airfoil, a first link pivoted to the tab and a second link pivoted to the airplane, said links being pivoted to each other and to a first connecting link upon a pivot axis that may be moved into substantial coincidence with the control airfoil hinge axis, a control element and a differential linkage connecting the element with the airfoil and said links, said differential linkage upon movement of the control element in either direction effecting movement of the airfoil in a corresponding direction or displacement of said link pivot axis in one direction from coincidence with the control airfoil hinge axis or both such airfoil movement and link pivot axis displacement, and elastic means for resisting such displacement of said link pivot axis.

6. In a control system for an airplane having a control airfoil hinged thereto, the combination therewith comprising a tab hinged to the trailing edge of the airfoil, a first link pivoted to the tab and a second link pivoted to the airplane, said links being pivoted to each other and to a first connecting link upon a pivot axis that may be moved into substantial coincidence with the control airfoil hinge axis, a control element and a differential linkage connecting the element with the airfoil and said links, said differential linkage upon movement of the control element effecting movement of the airfoil or displacement of said link pivot axis from coincidence with the control airfoil hinge axis or both airfoil movement and link pivot axis displacement, and elastic means for resisting such displacement of said link pivot axis.

7. In a control system for an airplane having a control airfoil hinged thereto, the combination therewith comprising a tab hinged to the airfoil, a tab operating link having a pivot connection to a member that is mounted for movement relative to the airplane, the axis of said pivot connection in one position of said member being substantially coincident with the control airfoil hinge axis so that the tab will have no substantial movement relative to the control airfoil upon movement of the latter, the tab being moved relative to the control airfoil upon movement of the latter when said pivot connection is displaced from the axis of the control airfoil hinge axis, a control element, differential means connecting the control element with the airfoil and with said member in such manner that upon movement of the control element in either direction from a neutral position there will be movement of the airfoil in a corresponding direction or movement of said member in only one direction from said one position thereof or both of said last-mentioned movements, and means for elastically holding said member in said one position thereof.

8. In a control system for an airplane having a control airfoil hinged thereto, the combination therewith comprising a tab hinged to the airfoil, a tab operating link having a pivot connection to a member that is mounted for movement relative to the airplane, the axis of said pivot connection in one position of said member being substantially coincident with the control airfoil hinge axis so that the tab will have no substantial movement relative to the control airfoil upon movement of the latter, the tab being moved relative to the control airfoil upon movement of the latter when said pivot connection is displaced from the axis of the control airfoil hinge axis, a control element and differential means connecting the control element with the airfoil and with said member in such manner that upon movement of the control element from a neutral position there will be movement of the airfoil or movement of said member or both of said last-mentioned movements, and means for elastically holding said member in said one position thereof.

9. In a control system for an airplane having a control airfoil hinged thereto, the combination therewith comprising a tab hinged to the airfoil, a tab operating link pivoted at one end to the tab and at the other end to the airplane and having a joint intermediate its ends at a point adjacent the airfoil hinge axis in such manner that the tab is deflected relative to the airfoil in response to and substantially in proportion to the deflection of the airfoil relative to the airplane but in the opposite direction, means operatively connected to said link for adjusting the location of the joint of said link toward and away from the airfoil hinge axis to vary the ratio of tab deflection to airfoil deflection, means for actuating the airfoil including a connection which yields substantially in proportion to the control force applied to the airfoil, and means operatively connected to said actuating means and to said adjusting means and responsive to such yielding of said connection to operate said adjusting means to increase the ratio of tab deflection to airfoil deflection.

HAROLD O. WENDT.

REFERENCES CITED

The following references are of record in the file of this patent:

UNITED STATES PATENTS

| Number | Name | Date |
|---|---|---|
| 2,357,465 | Focht | Sept. 5, 1944 |

FOREIGN PATENTS

| Number | Country | Date |
|---|---|---|
| 542,944 | Great Britain | Feb. 3, 1942 |